(No Model.)

E. F. STECK.
RESILIENT VALVE FOR SPRINKLER HEADS.

No. 585,130. Patented June 22, 1897.

WITNESSES:

INVENTOR
Ernst F. Steck
BY
ATTORNEYS

UNITED STATES PATENT OFFICE.

ERNST F. STECK, OF CHICAGO, ILLINOIS, ASSIGNOR TO THE FIRE EXTINGUISHER MANUFACTURING COMPANY, OF SAME PLACE AND NEW YORK, N. Y.

RESILIENT VALVE FOR SPRINKLER-HEADS.

SPECIFICATION forming part of Letters Patent No. 585,130, dated June 22, 1897.

Application filed November 17, 1896. Serial No. 612,424. (No model.)

*To all whom it may concern:*

Be it known that I, ERNST F. STECK, a citizen of the United States, residing at Chicago, in the county of Cook and State of Illinois, have invented certain new and useful Improvements in Resilient Valves for Sprinkler-Heads, of which the following is a specification.

This invention relates to improvements in resilient valves for sprinkler-heads; and its object is to protect the valve-locking mechanism from jar and consequent loosening by interposing a spring support or cushion between it and the water-pipe and also to securely support the locking mechanism. For this purpose I make the valve hollow and its upper face, on which the locking mechanism rests, elastic, so as to form a resilient support for the said mechanism. The valve is preferably made of thin top and bottom plates secured together at their edges, so that it is rigid at the edge, but yielding or elastic to some extent on both top and bottom. The bottom plate therefore first receives the impact of any water-pressure that may exist in the pipe and eases off any jar or vibration due to rush of water in the pipes or to water-hammer. The pressure is transmitted from the lower plate to the rigid edge and through the resilient top plate to the locking mechanism. The top and bottom plates and the air inclosed between them thus coöperate in forming an elastic cushion for the locking mechanism.

In application, Serial No. 608,809, filed October 14, 1896, I have shown a form of locking mechanism wherein plates or members bearing against the valve and a support and against each other are soldered together at a joint transverse to the side thereof on the plates, so that on release the tendency of the parts is to diverge and not to slide on one another. To more fully guard against any such sliding tendency as might result from inequality of friction or otherwise, I prefer to provide the lower one of such members with two bearing-points on the valve, preventing it from tipping, except in a direction transverse to the joint.

Figure 1:
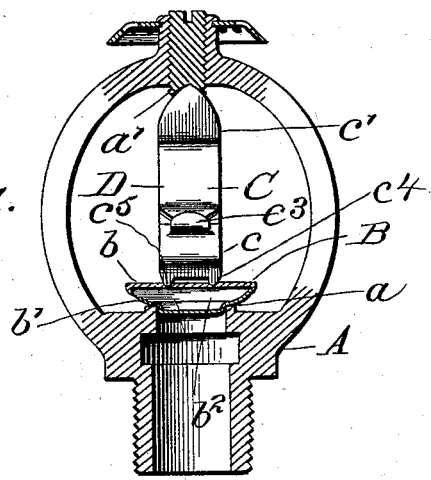
Figure 2:
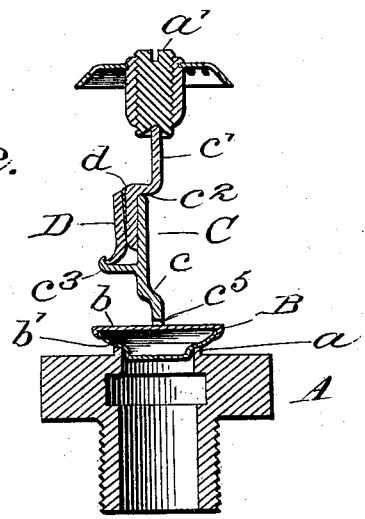
Figure 3:
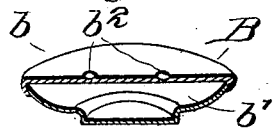

In the accompanying drawings, which form a part of this specification, Figure 1 is a central vertical section of a sprinkler-head embodying my invention. Fig. 2 is a vertical section taken at right angles to Fig. 1. Fig. 3 is a perspective sectional view of the valve.

A represents a sprinkler-head having a valve-seat $a$. The valve B rests on this seat, and a locking mechanism C is interposed between the valve and an adjustable screw-support $a'$ on the sprinkler-head. This locking mechanism may be of any suitable construction; but I prefer to use in connection with my invention a detachable locking device, such as shown herein, the same being similar to that shown in my application above referred to, except in particulars hereinafter pointed out.

The valve B consists of top plate $b$ and bottom plate $b'$, secured together at their edges, as by upsetting or turning the edge of one over the other, as indicated in Fig. 3. The top plate $b$ is of thin metal and is preferably flat, so that it forms a more or less elastic or yielding support for the locking mechanism, which bears against it. The bottom plate is also preferably of thin metal, but is dished or bent downwardly, so as to correspond to the shape of the valve-seat. There is thus inclosed between the top and bottom plates an air-space, which to some extent acts as a cushion between the locking mechanism and the water-pipe, though, as above stated, the resiliency or cushion effect is mainly derived from the springy nature of the top and bottom plates themselves.

The bottom plate $b'$, resting on the valve-seat, closes the valve-aperture and prevents contact of the extinguishing fluid with the elastic top plate $b$, so that the jar or strain resulting from the fluid-pressure cannot be directly imparted to the locking mechanism, but is transmitted through the yielding top plate $b$. The yielding nature of the bottom plate and the elasticity of the air inclosed in the hollow valve also contribute to the elastic support of the locking mechanism. The hollow valve is also of advantage in that it insulates or protects the locking mechanism from the cooling effect of the water in the supply-pipe, thereby rendering the sprinkler more certain and sensitive in operation.

I have herein shown a locking mechanism C, consisting of two plates or members $c$ and $c'$, bearing, respectively, against the valve B and against the screw-support $a'$. Both of these members are offset or bent to one side, and the end of the member $c$ bears against the member $c'$ at the offset or shoulder $c^2$ thus formed. The outer ends of said two members $c$ and $c'$ lie in close contact where they overlap, as shown, and are secured together by a third member D, which is fastened to the outer side of member $c'$ by a soldered joint $d$ and projecting beyond the end of said member engages with a hook or arm $c^3$, projecting from the member $c$. It will be seen that on melting of the soldered joint the three aforesaid members will all be thrust to one side and caused to diverge or turn on one another, thereby at once opening the soldered joint. In order to direct the motion of these parts more effectively in a plane transverse to that of the soldered joint and thereby obviate any possibility of sliding or dragging of the soldered joint, I prefer to give the lower member $c$ two points of support, as shown at $c^4 c^5$, on the valve B, the said two points of support being in a line substantially parallel to the soldered joint and engaging in indentations $b^2$ in the top of the valve.

Having thus described my invention, what I claim as new, and desire to secure by Letters Patent, is—

1. The combination in a sprinkler-head, of a locking mechanism having a fusible retaining-joint and a hermetically-closed hollow valve interposed between said locking mechanism and the valve-aperture.

2. A valve for automatic sprinkler-heads consisting of a hermetically-closed hollow shell having yielding or elastic top and bottom plates inclosing an air-chamber.

3. The combination, with the valve-seat and locking mechanism of an automatic sprinkler-head, of a valve consisting of a hermetically-closed shell with a bottom plate closing the valve-opening and a yielding top plate bearing against the locking mechanism.

4. A valve for automatic sprinkler-heads consisting of a hollow shell, formed of a flat top plate of thin metal and a dished bottom plate of thin metal fastened to the top plate at the edge the said bottom plate seating upon and closing the valve-opening.

ERNST F. STECK.

Witnesses:
O. S. DOOLITTLE,
L. W. MALLORY.